(12) United States Patent
Hwang et al.

(10) Patent No.: US 10,145,696 B2
(45) Date of Patent: Dec. 4, 2018

(54) METHOD FOR CLASSIFYING TARGET USING PATH HISTORY DATA DURING V2V COMMUNICATION

(71) Applicant: HYUNDAI MOTOR COMPANY, Seoul (KR)

(72) Inventors: Dae Sung Hwang, Hwaseong-si (KR); Dong Gyu Noh, Dongducheon-si (KR); Cho Rong Ryu, Incheon (KR); Jong Rok Park, Seoul (KR); Hahk Rel Noh, Bucheon-si (KR); Su Lyun Sung, Anyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 22 days.

(21) Appl. No.: 15/194,055

(22) Filed: Jun. 27, 2016

(65) Prior Publication Data

US 2017/0160091 A1   Jun. 8, 2017

(30) Foreign Application Priority Data

Dec. 8, 2015 (KR) .......................... 10-2015-0174298

(51) Int. Cl.
| | |
|---|---|
| G06F 17/10 | (2006.01) |
| G08G 1/16 | (2006.01) |
| G01C 21/00 | (2006.01) |
| G01C 21/34 | (2006.01) |
| G01C 21/36 | (2006.01) |

(Continued)

(52) U.S. Cl.
CPC ............ *G01C 21/34* (2013.01); *G01C 21/362* (2013.01); *G08G 1/00* (2013.01); *G08G 1/163* (2013.01); *G08G 1/166* (2013.01); *G08G 1/167* (2013.01); *B60W 30/16* (2013.01); *B60W 2530/14* (2013.01); *B60W 2550/306* (2013.01); *B60W 2550/402* (2013.01)

(58) Field of Classification Search
None
See application file for complete search history.

(56) References Cited

U.S. PATENT DOCUMENTS

| | | | | |
|---|---|---|---|---|
| 2007/0043506 | A1* | 2/2007 | Mudalige | B60T 7/22 701/301 |
| 2013/0069822 | A1* | 3/2013 | Wu | G01S 19/49 342/357.24 |

FOREIGN PATENT DOCUMENTS

| | | |
|---|---|---|
| JP | 2009-118059 A | 5/2009 |
| KR | 10-0603711 B1 | 7/2006 |
| KR | 10-2013-0134915 A | 12/2013 |

(Continued)

OTHER PUBLICATIONS

Korean Notification of Reason for Refusal dated Jun. 13, 2017 issued in Korean Patent Application No. 10-2015-0174298 (with English translation).

*Primary Examiner* — Adam D Tissot
(74) *Attorney, Agent, or Firm* — McDermott Will & Emery LLP

(57) ABSTRACT

A method for classifying a target using path history data during vehicle to vehicle (V2V) communication of a V2V communication system includes receiving the path history data from a relative vehicle, calculating a longitudinal distance from a self vehicle to the relative vehicle in relation to a heading direction of the self vehicle using the path history data, and classifying a target position of the relative vehicle using the path history data depending on the calculated longitudinal distance.

10 Claims, 9 Drawing Sheets

(51) Int. Cl.
*G08G 1/00* (2006.01)
*B60W 30/16* (2012.01)

(56) References Cited

FOREIGN PATENT DOCUMENTS

KR  10-1470231 B1  12/2014
KR  10-1544797 B1  8/2015

\* cited by examiner

METHOD FOR CLASSIFYING TARGET USING PATH HISTORY DATA DURING V2V COMMUNICATION

CROSS-REFERENCE TO RELATED APPLICATION

This application claims the benefit of priority to Korean Patent Application No. 10-2015-0174298, filed on Dec. 8, 2015 with the Korean Intellectual Property Office, the disclosure of which is incorporated herein in its entirety by reference.

TECHNICAL FIELD

The present disclosure relates to a method for classifying a target using path history data during vehicle of vehicle (V2V) communication, and more particularly, to a technology using a path history (PH) of a self vehicle and a relative vehicle.

BACKGROUND

A vehicle may be equipped with a long range distance measurement sensor, such as a long-range radar or an intermediate range distance measurement sensor, such that information measured by the distance measurement sensor is used for various systems.

As an example, the information measured by the long range distance measurement sensor is used for an adaptive cruise control (ACC) and a forward collision warning system (FCW), and the information measured by the intermediate range distance measurement sensor is used for blind spot detection (BSD).

However, the information measured by the distance measurement sensor equipped in the vehicle is used for only the corresponding vehicle, and is not utilized for other vehicles.

Meanwhile, vehicle to vehicle (V2V) communication transmits and receives data through a global positioning system (GPS), a controller area network (CAN) message, and the like between vehicles on which a vehicle communication terminal is mounted. The V2V communication is often used for a collision preventing system, which also refers to transmitting and receiving the data based on positional information of a corresponding vehicle sensed by each vehicle but is not used for sharing information of other obstacles sensed by the corresponding vehicle.

The V2V communication transmits and receives the data through the GPS, the CAN message, and the like between the vehicles, and the message includes path history (PH) data indicating a path history of the vehicle.

However, when a target is classified using the path history data in order to provide safety or a convenience service to the respective vehicles at the time of performing the V2V communication, a case in which the vehicles misrecognize the path history data may continuously occur.

SUMMARY

The present disclosure has been made to solve the above-mentioned problems occurring in the prior art while advantages achieved by the prior art are maintained intact.

An aspect of the present disclosure provides a method for classifying a target using path history data during vehicle to vehicle (V2V) communication capable of removing errors occurring in a case of classifying the target using position information of a self vehicle (HV) and the path history data of a relative vehicle (RV) and a case of classifying the target using the path history data of the self vehicle (HV) and position information of the relative vehicle (RV), solving a problem that a distance between the respective paths formed by connecting a left point and a right point which are perpendicular to a heading value of the self vehicle or the relative vehicle in relation to a path history point of the self vehicle or the relative vehicle is not constantly generated as much as a length of a lane width, and solving a problem about a region (a NULL region) between a path and a path perpendicular thereto occurring in a process of calculating a distance between a position and a path history path (a PH path) of the self vehicle or the relative vehicle.

Other objects and advantages of the present disclosure can be appreciated by the following description and will be clearly described by the exemplary embodiments of the present disclosure. It will be easily known that the objects and advantages of the present disclosure can be implemented by means and a combination thereof shown in the appended claims.

According to an exemplary embodiment of the present disclosure, a method for classifying a target using path history data during vehicle to vehicle (V2V) communication of a V2V communication system includes receiving the path history data from a relative vehicle; calculating a longitudinal distance from a self vehicle to the relative vehicle in relation to a heading direction of the self vehicle using the path history data; and classifying a target position of the relative vehicle using the path history data depending on the calculated longitudinal distance.

The calculating of the longitudinal distance from the self vehicle to the relative vehicle in relation to the heading direction of the self vehicle using the path history data may include converting global positioning system (GPS) coordinate values of the self vehicle and the relative vehicle into an earth-centered earth-fixed (ECEF) coordinate value; converting the earth-centered earth-fixed (ECEF) coordinate value into an east, north, up (ENU) coordinate value of the relative vehicle in relation to the self vehicle; converting the ENU coordinate value of the relative vehicle into a coordinate value based on the heading direction of the self vehicle in relation to the self vehicle; and calculating longitudinal and lateral distances from the self vehicle to the relative vehicle in relation to the heading direction of the self vehicle from the converted coordinate values.

The classifying of the target position of the relative vehicle using the path history data depending on the calculated longitudinal distance may include when the calculated longitudinal distance is a positive number, determining that the relative vehicle is positioned at the front of the self vehicle and classifying the target position of the relative vehicle using the path history data of the relative vehicle; and when the calculated longitudinal distance is a negative number, determining that the relative vehicle is positioned at the rear of the self vehicle and classifying the target position of the relative vehicle using the path history data of the self vehicle.

When the calculated longitudinal distance is a positive number, the determining that the relative vehicle is positioned at the front of the self vehicle and classifying the target position of the relative vehicle using the path history data of the relative vehicle may include calculating a straight distance (a) from a position of the self vehicle to a first path using the path history data of the relative vehicle; comparing the straight distance (a) from the position of the self vehicle to the first path with a half (½) value of a length of a lane width; when the straight distance (a) from the position of the self vehicle to the first path is less than the half value of the length of the lane width, calculating a position (a) of a point projected to the first path or an extension line of the first path from the position of the self vehicle; determining whether or not the position (A) of the point exists on the first path; when the position (A) of the point exists on the first path, comparing a heading value of the self vehicle with a gradient of the first path; and comparing a difference value between the heading value of the self vehicle and the gradient of the first path with a set angle, and ascertaining whether or not the position of the self vehicle is positioned at left or right in relation to the first path when the difference value between the heading value of the self vehicle and the gradient of the first path is less than the set angle.

The method may further include when the position (A) of the point does not exist on the first path, determining whether or not the position (A) of the point is positioned on a second path or a third path; and determining whether or not the self vehicle exists in a region between a path (M) perpendicular to the first path and a path (N) perpendicular to the second path, and projecting a coordinate of the self vehicle to a path history point of the relative vehicle and calculating a projected distance when the self vehicle exists in the region between the path (M) perpendicular to the first path and the path (N) perpendicular to the second path.

The method may further include when the self vehicle exists in the region between the path (M) perpendicular to the first path and the path (N) perpendicular to the second path, calculating gradients of the path (M) perpendicular to the first path and the path (N) perpendicular to the second path, and calculating a gradient of a distance (c) connecting the path history point on a path of the relative vehicle and the coordinate of the self vehicle; determining whether or not the gradient of the distance (c) is a value between the gradients of the path (M) perpendicular to the first path and the path (N) perpendicular to the second path; comparing the distance (c) with the half value of the length of the lane width; and when the distance (c) is less than the half value of the length of the lane width, comparing the heading value of the self vehicle and the gradients of the first path and the second path.

When the calculated longitudinal distance is a negative number, the determining that the relative vehicle is positioned at the rear of the self vehicle and classifying the target position of the relative vehicle using the path history data of the self vehicle may include calculating a distance (a) from a position of the relative vehicle to a first path using the path history data of the self vehicle; comparing the distance (a) from the position of the relative vehicle to the first path with a half (½) value of a length of a lane width; when the distance (a) from the position of the relative vehicle to the first path is less than the half value of the length of the lane width, calculating a position (a) of a point projected to an extension line of the first path from the position of the relative vehicle; determining whether or not the position (A) of the point exists on the first path; when the position (A) of the point exists on the first path, comparing a heading value of the relative vehicle with a gradient of the first path; and comparing a difference value between the heading value of the relative vehicle and the gradient of the first path with a set angle, and ascertaining whether or not the position of the relative vehicle is positioned at left or right in relation to the first path when the difference value between the heading value of the relative vehicle and the first path is less than the set angle.

The method may further include when the position (A) of the point does not exist on the first path, determining whether or not the position (A) of the point is positioned on a second path or a third path; and determining whether or not the relative vehicle exists in a region between a path (M) perpendicular to the first path and a path (N) perpendicular to the second path, and projecting a coordinate of the relative vehicle to a path history point of the self vehicle and calculating a projected distance when the relative vehicle exists in the region between the path (M) perpendicular to the first path and the path (N) perpendicular to the second path.

The method may further include when the relative vehicle exists in the region between the path (M) perpendicular to the first path and the path (N) perpendicular to the second path, calculating gradients of the path (M) perpendicular to the first path and the path (N) perpendicular to the second path, and calculating a gradient of a distance (c) connecting the path history point on a path of the self vehicle and the coordinate of the self vehicle; determining whether or not the gradient of the distance (c) is a value between the gradients of the path (M) perpendicular to the first path and the path (N) perpendicular to the second path; comparing the distance (c) with the half value of the length of the lane width; and when the distance (c) is less than the half value of the length of the lane width, comparing the heading value of the relative vehicle and the gradients of the first path and the second path.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
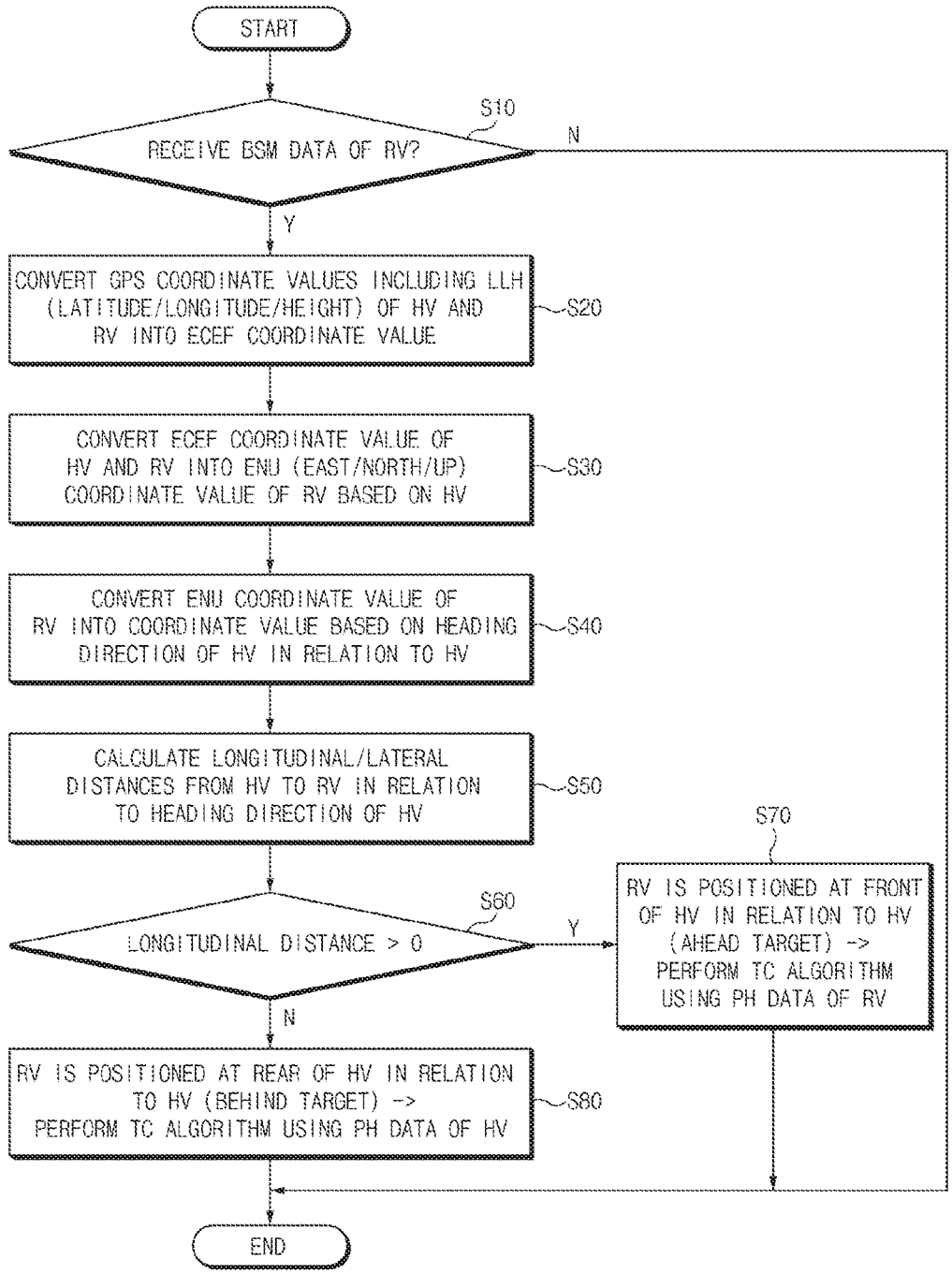
FIG. 1 is a flowchart illustrating a method for classifying a target using path history data during vehicle to vehicle (V2V) communication according to an exemplary embodiment of the present disclosure.

Advantages and features of the present disclosure and methods to achieve them will be described from exemplary embodiments described below in detail with reference to the accompanying drawings. However, the present disclosure is not limited to the exemplary embodiments set forth herein, but may be modified in many different forms. Merely, the exemplary embodiments of the present disclosure will be provided to describe the spirit of the present disclosure in detail so that those skilled in the art may easily implement the spirit of the present disclosure.

In the drawings, the exemplary embodiments of the present disclosure are not limited to illustrated specific forms, but may be exaggerated for clarity. In the present specification, specific terms have been used, but are only used for the purpose of describing the present disclosure and are not used for qualifying the meaning or limiting the scope of the present disclosure, which is disclosed in the appended claims.

In the present specification, an expression 'and/or' is used as a meaning including at least one of components listed before and after the expression. In addition, an expression 'connected to or coupled to' is used as a meaning including a case in which one component is directly connected to another component or is indirectly connected through another component. Unless explicitly described to the contrary, a singular form includes a plural form in the present specification. In addition, components, steps, operations, and elements mentioned by 'comprise' or 'comprising' used in the present specification mean the existence or addition of one or more other components, steps, operations, and elements.

Hereinafter, exemplary embodiments of the present disclosure will be described in detail with reference to the accompanying drawings.

In a vehicle to vehicle (V2V) communication system according to the present disclosure, a self vehicle or a relative vehicle may transmit and receive a basic safety message (BSM) between vehicles using an on-board unit (OBU) mounted in each vehicle, and provide a safety or convenience service to a driver or a passenger using the BSM.

FIG. 1 is a flowchart illustrating a method for classifying a target using path history data during vehicle to vehicle (V2V) communication according to an exemplary embodiment of the present disclosure.

Referring to FIG. 1, the V2V communication system may determine whether or not the BSM (path history data) of the relative vehicle is received (S10).

Next, the V2V communication system may convert a GPS coordinate value including a latitude, a longitude, or a height of the self vehicle and the relative vehicle into an earth-centered earth-fixed (ECEF) coordinate value (S20).

Next, the V2V communication system may convert the ECEF coordinate value of the self vehicle and the relative vehicle into an east, north, up (ENU) coordinate value of the relative vehicle in relation to the self vehicle (S30).

Next, the V2V communication system may convert the ENU coordinate value of the relative vehicle into a coordinate value based on a heading direction of the self vehicle in relation to the self vehicle (S40).

Next, the V2V communication system may calculate longitudinal and lateral distances from the self vehicle to the relative vehicle in relation to the heading direction of the self vehicle from the converted coordinate values (S50).

Next, if the calculated longitudinal distance is a positive number (greater than 0), the V2V communication system may determine that the relative vehicle is positioned at the front of the self vehicle in relation to the self vehicle. That is, the V2V communication system may perform a target classification algorithm using path history data (PH data) of the relative vehicle. A method for performing the target classification algorithm using path history data of the relative vehicle will be described in detail with reference to FIGS. 2 and 3 (S60, S70).

Next, if the calculated longitudinal distance is a negative number (less than 0), the V2V communication system may determine that the relative vehicle is positioned at the rear of the self vehicle in relation to the self vehicle. That is, the V2V communication system may perform the target classification algorithm using path history data of the self vehicle.

A method for performing the target classification algorithm using path history data of the self vehicle will be described in detail with reference to FIGS. 6 and 7 (S60, S80).

Figure 2:
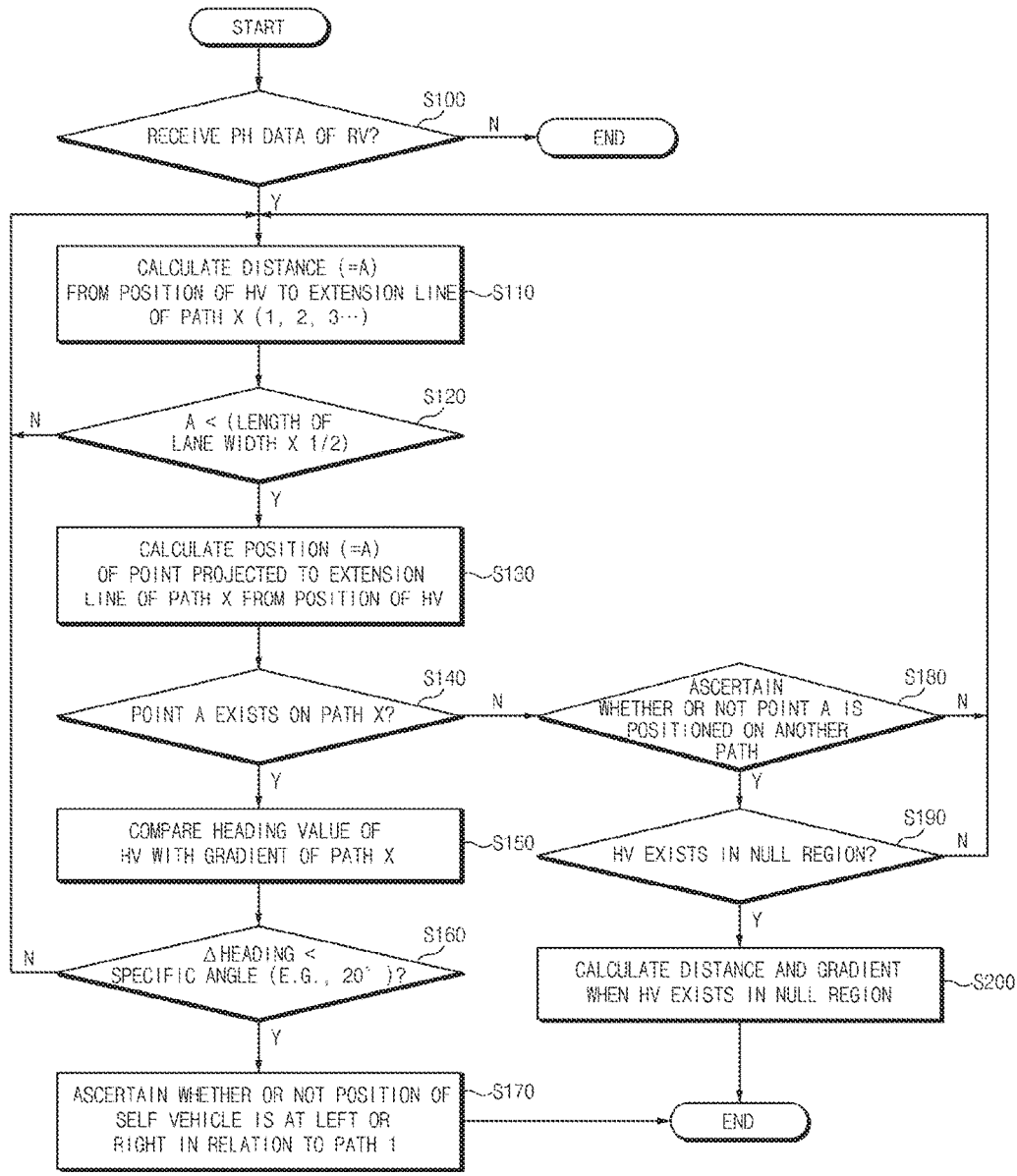
FIGS. 2 and 3 are views illustrating a method for classifying a target using path history data during vehicle to vehicle (V2V) communication in a case in which a relative vehicle (RV) exists at the front of a self vehicle (HV) according to an exemplary embodiment of the present disclosure.
Figure 3:
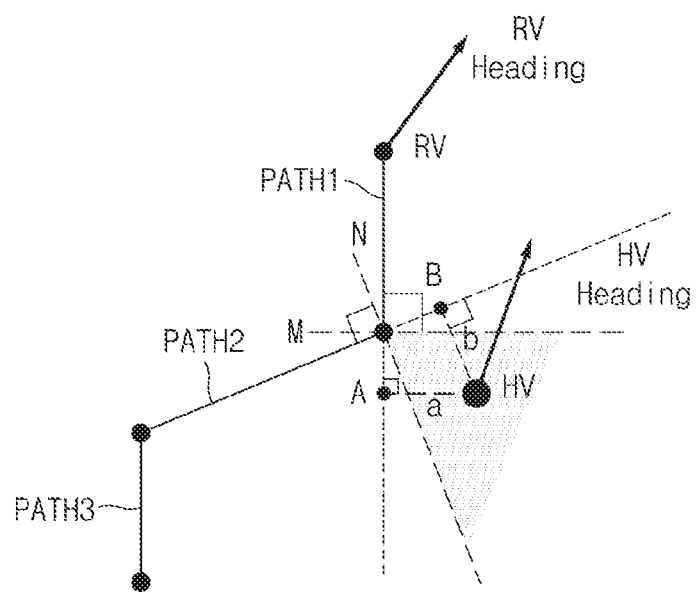

FIGS. 2 and 3 are views illustrating a method for classifying a target using path history data during vehicle to vehicle (V2V) communication in a case in which a relative vehicle (RV) exists at the front of a self vehicle (HV) according to an exemplary embodiment of the present disclosure.

Referring to FIGS. 2 and 3, in the case in which the relative vehicle (RV) exists at the front of the self vehicle (HV) in relation to the self vehicle, in order to solve a problem that a lane width is not constantly generated between a PH center path, a PH left path, or a PH right path of the relative vehicle, the V2V communication system may calculate a distance from a coordinate of the self vehicle using only the PH center path of the relative vehicle, and may perform a target classification for a position of the self vehicle in relation to the calculated distance and the PH center path of the relative vehicle.

First, the V2V communication system may determine whether or not the path history data of the relative vehicle is received (S100).

Next, the V2V communication system may calculate a distance (a) from a position of the self vehicle to an extension line of a path X (S110).

Here, the path X may include a first path, a second path, a third path, or other paths on which the relative vehicle moves, but the present disclosure will describe the path X as being limited to the first path. Further, the V2V communication system may sequentially calculate a distance with the position of the self vehicle from the first path to a next path.

Next, the V2V communication system may compare the distance (a) from the position of the self vehicle to an extension line of the first path with a half (½) value of a length of the lane width (S120). Here, although the lane width is not illustrated, the lane width may indicate a width of a general lane, and may indicate a width of a lane on which the self vehicle is being driven.

Next, if the distance (a) from the position of the self vehicle to the extension line of the first path is less than the half value of the length of the lane width, the V2V communication system may calculate a position (A) of a point projected from the position of the self vehicle to the extension line of the first path (S130).

Next, the V2V communication system may determine whether or not the position (A) of the point exists on the first path (S140).

Next, if the position (A) of the point exists on the first path, the V2V communication system may compare the heading value of the self vehicle with a gradient of the first path (S150).

Next, the V2V communication system may compare a difference value (Δ heading value) between the heading value of the self vehicle and the gradient of the first path with a set angle (S160). For example, the set angle may be 20°.

In addition, if the difference value between the heading value of the self vehicle and the gradient of the first path is less than the set angle, the V2V communication system may ascertain whether the position of the self vehicle is located to the left or right in relation to the first path (S170). In addition, the V2V communication system may compare the distance (a) from the position of the self vehicle to the extension line of the first path calculated in the above-mentioned operation with the lane width.

For example, if the position of the self vehicle is located to the left in relation to the first path, and the distance (a) is less than a half of the lane width, the V2V communication system may determine that the relative vehicle is at the front of the same path as the self vehicle.

If the position of the self vehicle is located to the left in relation to the first path, and the distance (a) is less than 1.5 times of the lane width, the V2V communication system may determine that the relative vehicle is at the front of a left path of the self vehicle.

If the position of the self vehicle is located to the right in relation to the first path, and the distance (a) is less than the half of the lane width, the V2V communication system may determine that the relative vehicle is at the front of the same path as the self vehicle.

As another example, if the position of the self vehicle is located to the right in relation to the first path, and the distance (a) is less than 1.5 times of the lane width, the V2V communication system may determine that the relative vehicle is at the front of a right path of the self vehicle.

However, if the difference value between the heading value of the self vehicle and the gradient of the first path is greater than the set angle, the V2V communication system may determine whether or not the self vehicle is positioned on another path (a second path, a third path, or the like), not the first path of the relative vehicle.

Here, if the position (A) of the point calculated in the above-mentioned operation does not exist on the first path, the V2V communication system may determine whether or not the path of the relative vehicle is the first path (180).

Next, the V2V communication system may determine whether or not the self vehicle exists in a region between a path (M) perpendicular to the first path and a path (N) perpendicular to the second path. If the self vehicle exists in the region (a NULL region) between the path (M) perpendicular to the first path and the path (N) perpendicular to the second path, the V2V communication system may project a coordinate of the self vehicle to a path history point (PH point) of the relative vehicle and may calculate a projected distance and a gradient (S190, S200). In the case in which the self vehicle exists in the NULL region, a method for classifying a target for the relative vehicle together with the position of the self vehicle will be described in detail with reference to FIGS. 4 and 5.

Figure 4:
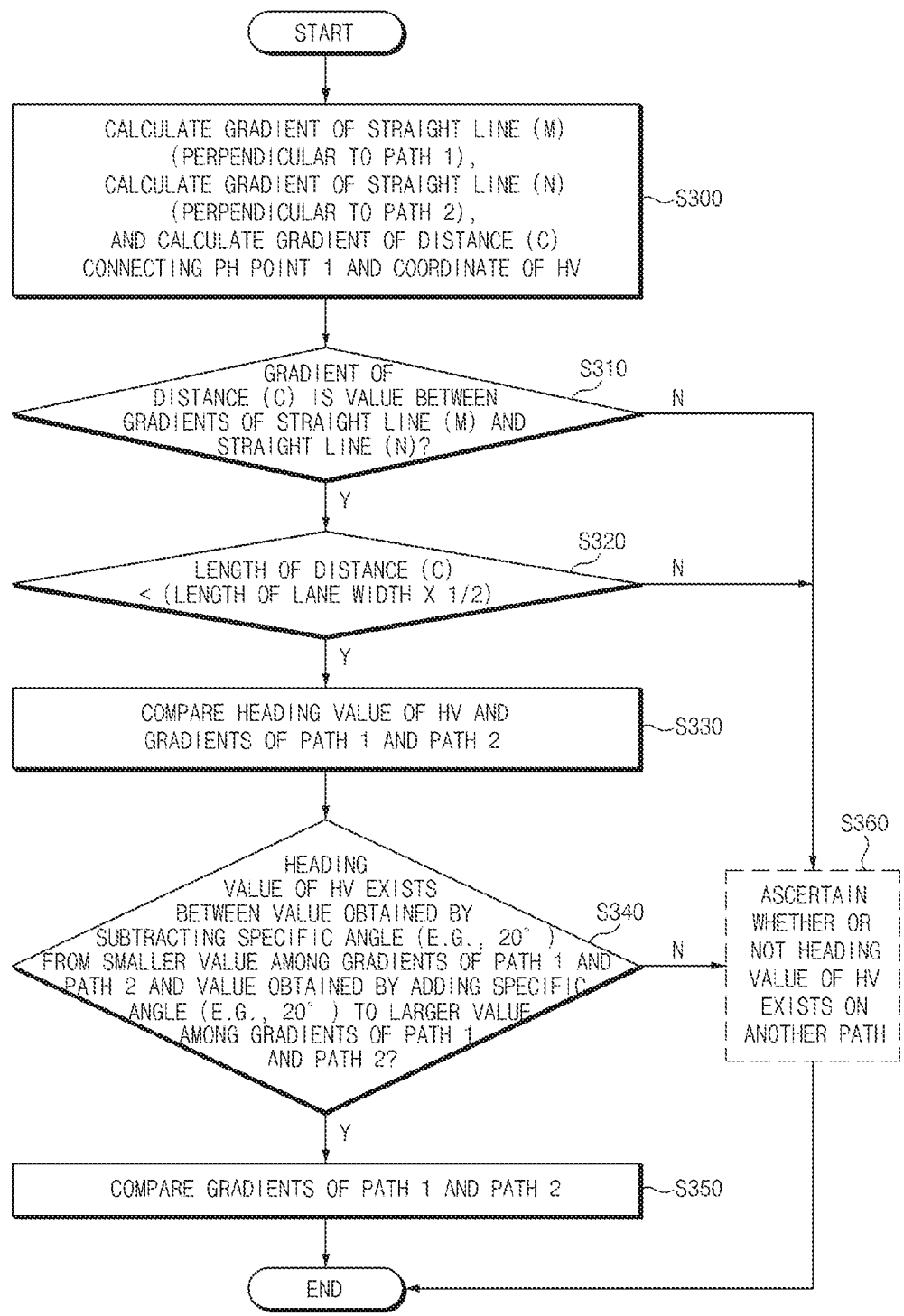
FIGS. 4 and 5 are views illustrating a case in which a self vehicle exists in a NULL region occurring due to a direction (angle) difference of a path history in a method for classifying a target using path history data during vehicle to vehicle (V2V) communication in a case in which a relative vehicle (RV) exists at the front of the self vehicle (HV) according to another exemplary embodiment of the present disclosure.
Figure 5:
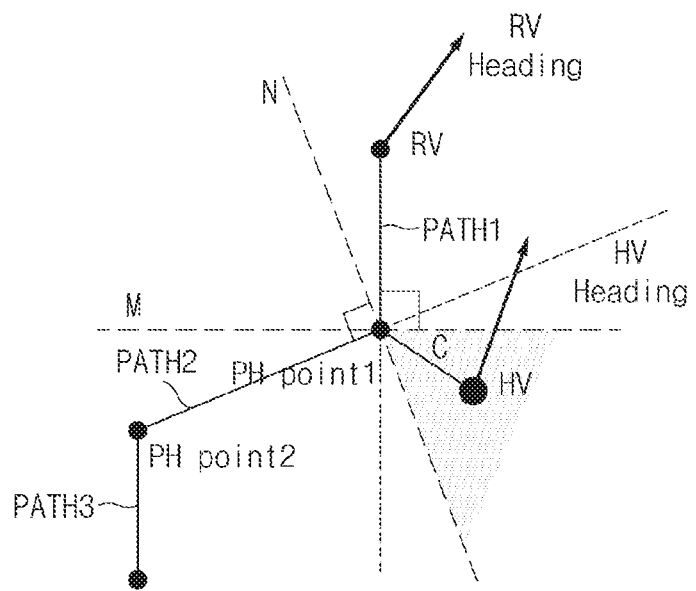

FIGS. 4 and 5 are views illustrating a case in which a self vehicle exists in a NULL region occurring due to a direction (angle) difference of a path history in a method for classifying a target using path history data during vehicle to vehicle (V2V) communication in a case in which a relative vehicle (RV) exists at the front of the self vehicle (HV) according to another exemplary embodiment of the present disclosure.

Referring to FIGS. 4 and 5, if the relative vehicle RV exists at the front of the self vehicle HV in relation to the self vehicle, the V2V communication system may determine whether or not the self vehicle exists in the NULL region in order to solve the problem about the NULL region occurring in the process of calculating the distance between the position of the self vehicle and a path history of the relative vehicle. If the self vehicle exists in the NULL region, the V2V communication system may project the coordinate of the self vehicle to the path history point of the relative vehicle, thereby calculating a distance spaced therebetween and determining the position of the self vehicle.

First, the V2V communication system may calculate gradients of the path (M) perpendicular to the first path and the path (N) perpendicular to the second path, and calculate a gradient of a distance (c) connecting the path history point on the path of the relative vehicle and the coordinate of the self vehicle (S300).

Next, the V2V communication system may determine whether or not the gradient of the distance (c) is a value between the gradients of the path (M) perpendicular to the first path and the path (N) perpendicular to the second path (S310).

Next, the V2V communication system may compare a length of the distance (c) with the half value of the length of the lane width (S320).

Next, if the length of the distance (c) is less than the half value of the length of the lane width, the V2V communication system may compare the heading value of the self vehicle with the gradients of the first path and the second path (S330).

Next, the V2V communication system may determine whether or not the heading value of the self vehicle exists between a value obtained by subtracting the set angle from a smaller value among the gradients of the first path and the second path and a value obtained by adding the set angle to a larger value among the gradients of the first path and the second path (S340).

In addition, if the heading value of the self vehicle exists between the value obtained by subtracting the set angle from the smaller value among the gradients of the first path and the second path and the value obtained by adding the set angle to the larger value among the gradients of the first path and the second path, the V2V communication system may compare the gradients of the first path and the second path (S350).

For example, if the gradient of the first path is less than the gradient of the second path (the NULL region exists at left), and the distance (c) is less than the half of the lane width, the V2V communication system may determine that the relative vehicle is at the front of the same path as the self vehicle.

As another example, if the gradient of the first path is less than the gradient of the second path (the NULL region exists at left), and the distance (c) is less than 1.5 times of the lane width, the V2V communication system may determine that the relative vehicle is at the front of the left path of the self vehicle.

As another example, if the gradient of the first path is greater than the gradient of the second path (the NULL region exists at right), and the distance (c) is less than the half of the lane width, the V2V communication system may determine that the relative vehicle is at the front of the same path as the self vehicle.

As another example, if the gradient of the first path is greater than the gradient of the second path (the NULL region exists at right), and the distance (c) is less than 1.5 times of the lane width, the V2V communication system may determine that the relative vehicle is at the front of the right path of the self vehicle.

However, if the heading value of the self vehicle does not exist between the value obtained by subtracting the set angle from the smaller value among the gradients of the first path and the second path and the value obtained by adding the set angle to the larger value among the gradients of the first path and the second path, the V2V communication system may determine whether or not the self vehicle exists on the second path or the third path of the relative vehicle (S360).

Figure 6:
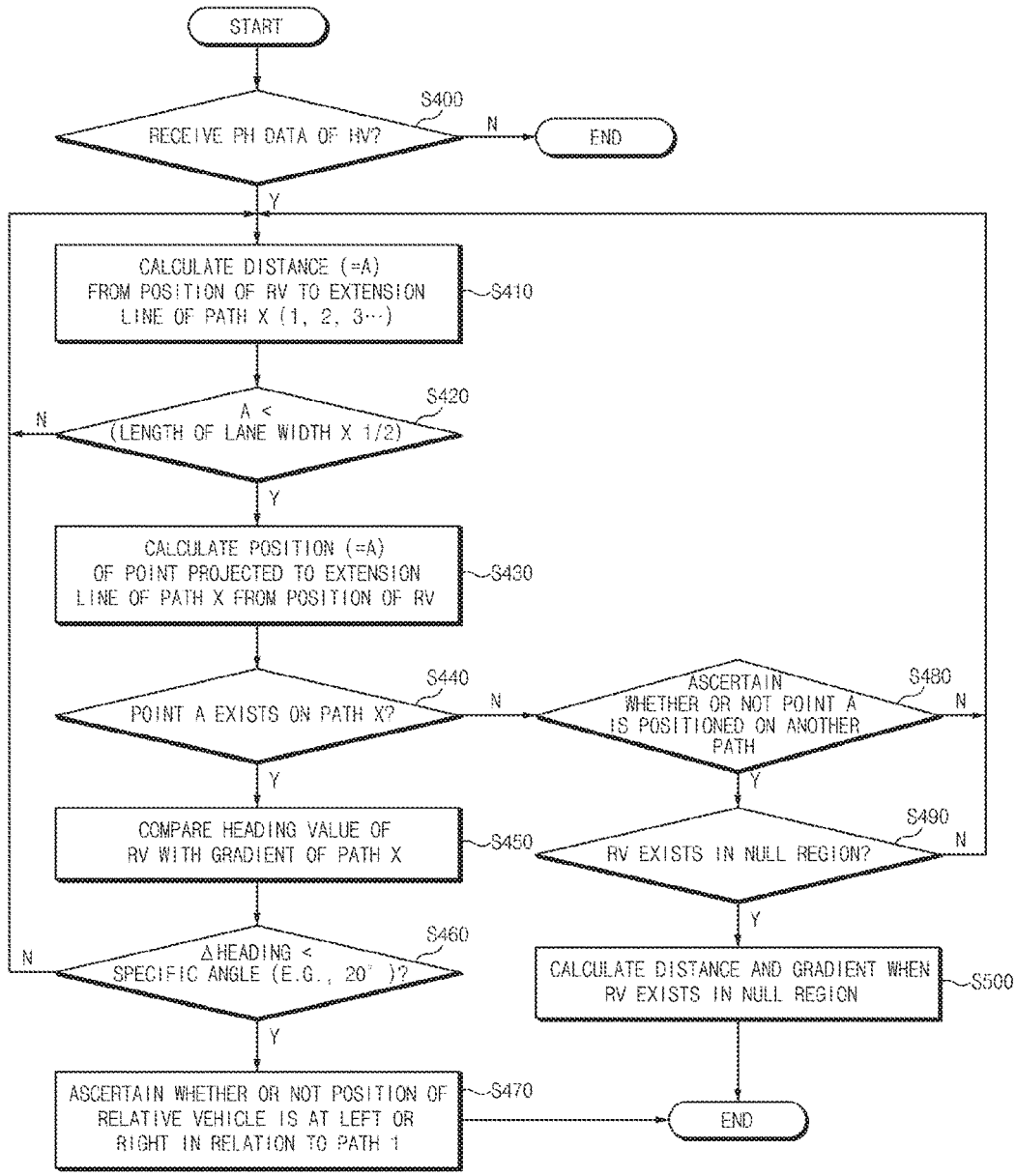
FIGS. 6 and 7 are views illustrating a method for classifying a target using path history data during vehicle to vehicle (V2V) communication in a case in which a relative vehicle (RV) exists at the rear of a self vehicle (HV) according to an exemplary embodiment of the present disclosure.
Figure 7:
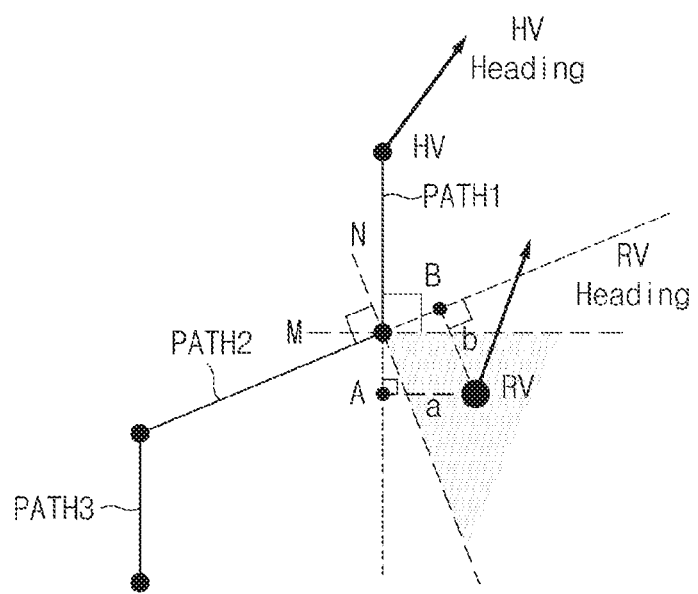

FIGS. 6 and 7 are views illustrating a method for classifying a target using path history data during vehicle to vehicle (V2V) communication in a case in which a relative vehicle (RV) exists at the rear of a self vehicle (HV) according to an exemplary embodiment of the present disclosure.

Referring to FIGS. 6 and 7, in the case in which the relative vehicle (RV) exists at the rear of the self vehicle (HV) in relation to the self vehicle, in order to solve a problem that a path width is not constantly generated between a PH center path, a left path, or a right path of the self vehicle, the V2V communication system may calculate a distance from a coordinate of the self vehicle using only the PH center path of the self vehicle, and may perform a target classification for a position of the relative vehicle in relation to the calculated distance and the PH center path of the self vehicle.

First, the V2V communication system may determine whether or not path history data of the self vehicle is received (S400).

Next, the V2V communication system may calculate a distance (a) from a position of the relative vehicle to an extension line of a path X (S410). Here, the path X may include a first path, a second path, a third path, or other paths on which the self vehicle moves, but the present disclosure will describe the path X as being limited to the first path.

Further, the V2V communication system may sequentially calculate a distance with the position of the relative vehicle from the first path to a next path.

Next, the V2V communication system may compare the distance (a) from the position of the relative vehicle to an extension line of the first path with a half (½) value of a length of the lane width (S420). Here, although the lane width is not illustrated, the lane width may mean a width of a general lane, and may mean a width of a lane on which the relative vehicle is being driven.

Next, if the distance (a) from the position of the relative vehicle to the extension line of the first path is less than the half value of the length of the lane width, the V2V communication system may calculate a position (A) of a point projected from the position of the relative vehicle to the extension line of the first path (S430).

Next, the V2V communication system may determine whether or not the position (A) of the point exists on the first path (S440).

Next, if the position (A) of the point exists on the first path, the V2V communication system may compare the heading value of the relative vehicle with a gradient of the first path (S450).

Next, the V2V communication system may compare a difference value between the heading value of the relative vehicle and the gradient of the first path with a set angle (S460). For example, the set angle may be 20°.

In addition, if the difference value between the heading value of the relative vehicle and the gradient of the first path is less than the set angle, the V2V communication system may ascertain whether the position of the relative vehicle is at the left or right in relation to the first path (S470). In addition, the V2V communication system may compare the distance (a) from the position of the relative vehicle to the extension line of the first path calculated in the above-mentioned operation with the lane width.

For example, if the position of the relative vehicle is located to the left in relation to the first path, and the distance (a) is less than a half of the lane width, the V2V communication system may determine that the self vehicle is at the front of the same path as the relative vehicle.

As another example, if the position of the relative vehicle is located to the left in relation to the first path, and the distance (a) is less than 1.5 times of the lane width, the V2V communication system may determine that the self vehicle is at the front of a left path of the relative vehicle.

As another example, if the position of the relative vehicle is located at the right in relation to the first path, and the distance (a) is less than the half of the lane width, the V2V communication system may determine that the self vehicle is at the front of the same path as the relative vehicle.

As another example, if the position of the relative vehicle is located at the right in relation to the first path, and the distance (a) is less than 1.5 times of the lane width, the V2V communication system may determine that the self vehicle is at the front of a right path of the relative vehicle.

However, if the difference value between the heading value of the relative vehicle and the gradient of the first path is greater than the set angle, the V2V communication system may determine whether or not the self vehicle is positioned on another path (a second path, a third path, or the like), and not on the first path of the relative vehicle.

Here, if the position (A) of the point calculated in the above-mentioned operation does not exist on the first path, the V2V communication system may determine whether or not the path of the self vehicle is the first path (S480).

Next, the V2V communication system may determine whether or not the relative vehicle exists in a region (a NULL region) between a path (M) perpendicular to the first path and a path (N) perpendicular to the second path. If the relative vehicle exists in the region between the path (M) perpendicular to the first path and the path (N) perpendicular to the second path, the V2V communication system may project a coordinate of the relative vehicle to a path history point of the self vehicle and may calculate a projected distance and a gradient (S490, S500). In the case in which the relative vehicle exists in the NULL region, a method for classifying a target for the self vehicle together with the position of the relative vehicle will be described in detail with reference to FIGS. 8 and 9.

Figure 8:
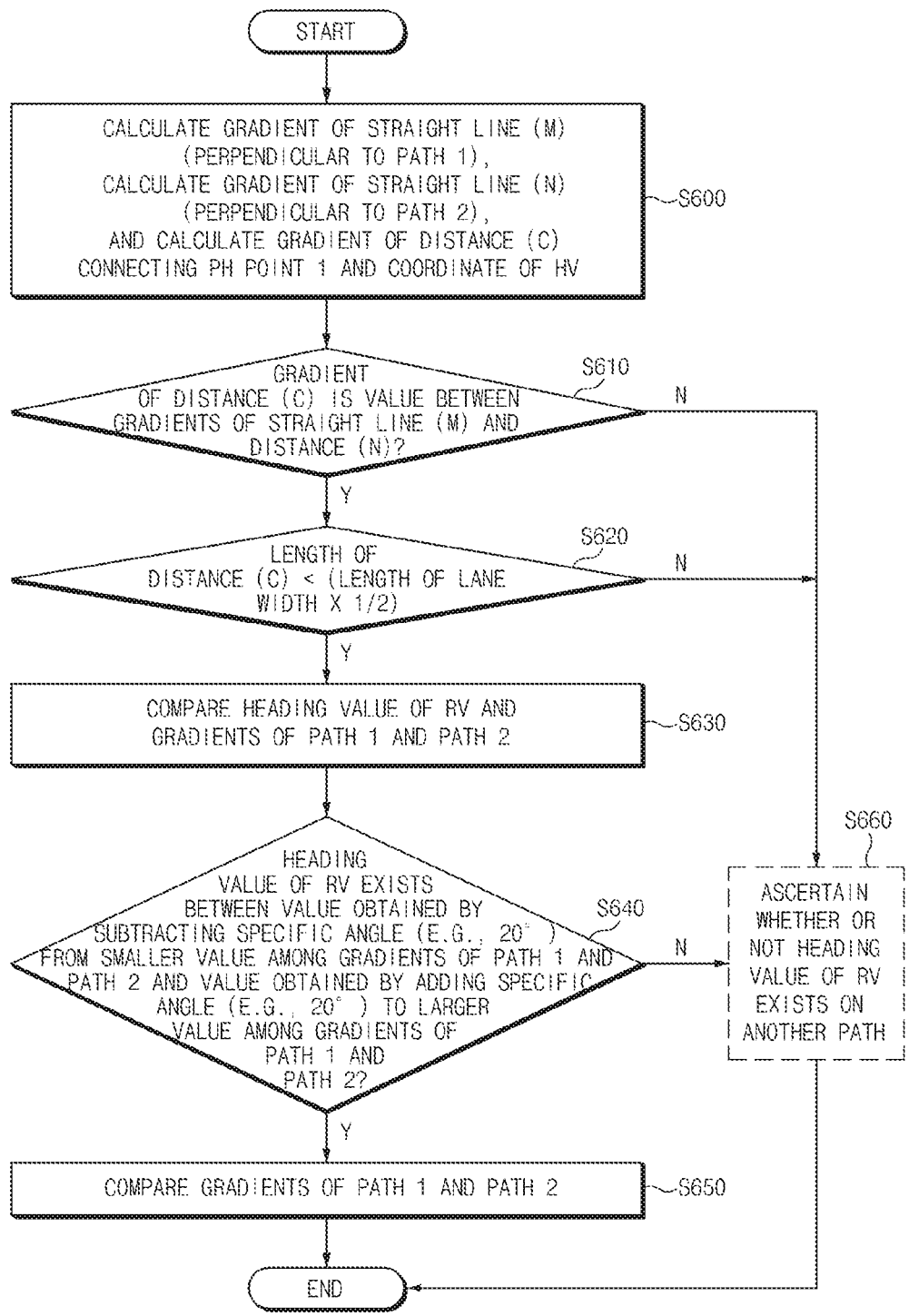
FIGS. 8 and 9 are views illustrating a case in which a relative vehicle exists in a NULL region occurring due to a direction (angle) difference of a path history in a method for classifying a target using path history data during vehicle to vehicle (V2V) communication in a case in which the relative vehicle (RV) exists at the rear of a self vehicle (HV) according to another exemplary embodiment of the present disclosure.
Figure 9:
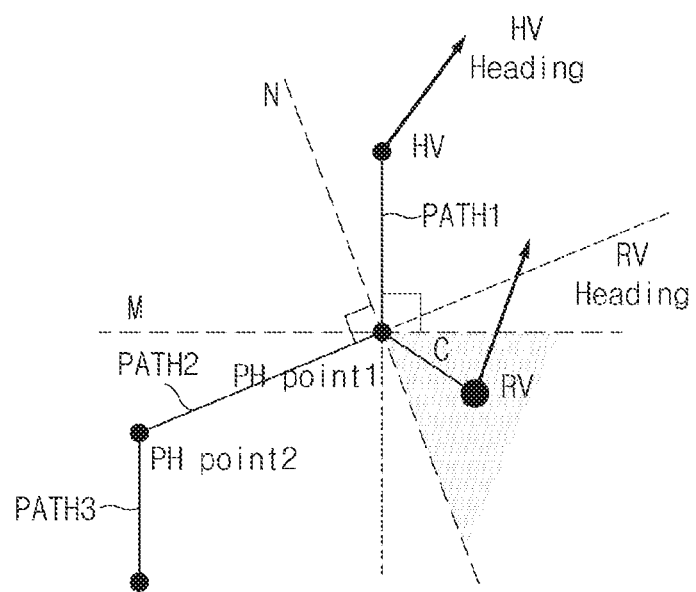

FIGS. 8 and 9 are views illustrating a case in which a relative vehicle exists in a NULL region occurring due to a direction (angle) difference of a path history in a method for classifying a target using path history data during vehicle to vehicle (V2V) communication in a case in which the relative vehicle (RV) exists at the rear of a self vehicle (HV) according to another exemplary embodiment of the present disclosure.

Referring to FIGS. 8 and 9, if the relative vehicle RV exists at the rear of the self vehicle HV in relation to the self vehicle, the V2V communication system may determine whether or not the relative vehicle exists in the NULL region in order to solve the problem about the NULL region occurring in the process of calculating the distance between the position of the relative vehicle and a path history of the self vehicle. If the relative vehicle exists in the NULL region, the V2V communication system may project the coordinate of the relative vehicle to the path history point of the self vehicle, thereby calculating a distance spaced therebetween and determining the position of the relative vehicle.

First, the V2V communication system may calculate gradients of the path (M) perpendicular to the first path and the path (N) perpendicular to the second path, and may calculate a gradient of a distance (c) connecting the path history point on the path of the self vehicle and the coordinate of the self vehicle (S600).

Next, the V2V communication system may determine whether or not the gradient of the distance (c) is a value between the gradients of the path (M) perpendicular to the first path and the path (N) perpendicular to the second path (S610).

Next, the V2V communication system may compare a length of the distance (c) with the half value of the length of the lane width (S620).

Next, if the length of the distance (c) is less than the half value of the length of the lane width, the V2V communication system may compare the heading value of the relative vehicle with the gradients of the first path and the second path (S630).

Next, the V2V communication system may determine whether or not the heading value of the relative vehicle exists between a value obtained by subtracting the set angle from a smaller value among the gradients of the first path and the second path and a value obtained by adding the set angle to a larger value among the gradients of the first path and the second path (S640).

In addition, if the heading value of the relative vehicle exists between the value obtained by subtracting the set angle from the smaller value among the gradients of the first path and the second path and the value obtained by adding the set angle to the larger value among the gradients of the first path and the second path, the V2V communication system may compare the gradients of the first path and the second path (S650).

For example, if the gradient of the first path is less than the gradient of the second path (the NULL region exists at left), and the distance (c) is less than the half of the lane width, the V2V communication system may determine that the self vehicle is located at the front of the same path as the relative vehicle.

As another example, if the gradient of the first path is less than the gradient of the second path (the NULL region exists at left), and the distance (c) is less than 1.5 times of the lane width, the V2V communication system may determine that the self vehicle is located at the front of the left path of the relative vehicle.

As another example, if the gradient of the first path is greater than the gradient of the second path (the NULL region exists at right), and the distance (c) is less than the half of the lane width, the V2V communication system may determine that the self vehicle is located at the front of the same path as the relative vehicle.

As another example, if the gradient of the first path is greater than the gradient of the second path (the NULL region exists at right), and the distance (c) is less than 1.5 times of the lane width, the V2V communication system may determine that the self vehicle is located at the front of the right path of the relative vehicle.

However, if the heading value of the relative vehicle does not exist between the value obtained by subtracting the set angle from the smaller value among the gradients of the first path and the second path and the value obtained by adding the set angle to the larger value among the gradients of the first path and the second path, the V2V communication system may determine whether or not the relative vehicle exists on the second path or the third path of the self vehicle (S660).

As described above, according to exemplary embodiments of the present disclosure, it is possible to solve the problem that the distance between the PH center path, the left path, or the right path of the self vehicle or the relative vehicle is not constantly generated as much as the length of the lane width in the process of generating the left point and the right point, which are currently perpendicular to the heading of the self vehicle or the relative vehicle at the path history point of the self vehicle or the relative vehicle.

Further, according to exemplary embodiments of the present disclosure, it is possible to solve the problem about the NULL region occurring in the process of calculating the distance between the position and the path history of the self vehicle or the relative vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for classifying a target using path history data during vehicle to vehicle (V2V) communication of a V2V communication system, the method comprising:
    receiving the path history data from a relative vehicle;
    calculating a longitudinal distance from a self vehicle to the relative vehicle in relation to a heading direction of the self vehicle using the path history data; and
    classifying a target position of the relative vehicle using the path history data depending on the calculated longitudinal distance,
    wherein by the calculated longitudinal distances, when it is determined that the relative vehicle is positioned at the rear of the self vehicle, classifying the target position of the relative vehicle using the path history data of the self vehicle including a first path and a second path,
    wherein the classifying the target position of the relative vehicle using the path history data includes:
    projecting a coordinate of the relative vehicle to a path history point of the self vehicle and
    calculating a projected distance when the relative vehicle exists in the region between a path (M) perpendicular to the first path and a path (N) perpendicular to the second path.

2. The method according to claim 1, wherein the step of calculating of the longitudinal distance from the self vehicle to the relative vehicle in relation to the heading direction of the self vehicle using the path history data includes:
    converting global positioning system (GPS) coordinate values of the self vehicle and the relative vehicle into an earth-centered earth-fixed (ECEF) coordinate value;
    converting the ECEF coordinate value into an east, north, up (ENU) coordinate value of the relative vehicle in relation to the self vehicle;
    converting the ENU coordinate value of the relative vehicle into a coordinate value based on the heading direction of the self vehicle in relation to the self vehicle; and
    calculating longitudinal and lateral distances from the self vehicle to the relative vehicle in relation to the heading direction of the self vehicle from the converted coordinate values.

3. The method according to claim 1, wherein the step of classifying of the target position of the relative vehicle using the path history data depending on the calculated longitudinal distance includes:
when the calculated longitudinal distance is a positive number, determining that the relative vehicle is positioned at the front of the self vehicle and classifying the target position of the relative vehicle using the path history data of the relative vehicle; and
when the calculated longitudinal distance is a negative number, determining that the relative vehicle is positioned at the rear of the self vehicle and classifying the target position of the relative vehicle using the path history data of the self vehicle.

4. The method according to claim 3, wherein when the calculated longitudinal distance is a positive number, the step of determining that the relative vehicle is positioned at the front of the self vehicle and classifying the target position of the relative vehicle using the path history data of the relative vehicle includes:
calculating a straight distance (a) from a position of the self vehicle to the first path using the path history data of the relative vehicle;
comparing the straight distance (a) from the position of the self vehicle to the first path with a half (½) value of a length of a lane width;
when the straight distance (a) from the position of the self vehicle to the first path is less than the half value of the length of the lane width,
calculating a position (A) of a point projected to the first path or an extension line of the first path from the position of the self vehicle;
determining whether or not the position (A) of the point exists on the first path;
when the position (A) of the point exists on the first path, comparing a heading value of the self vehicle with a gradient of the first path; and
comparing a difference value between the heading value of the self vehicle and the gradient of the first path with a set angle, and ascertaining whether or not the position of the self vehicle is positioned at the left or right in relation to the first path when the difference value between the heading value of the self vehicle and the gradient of the first path is less than the set angle.

5. The method according to claim 4, further comprising:
when the position (A) of the point does not exist on the first path, determining whether or not the position (A) of the point is positioned on the second path or a third path; and
determining whether or not the self vehicle exists in a region between the path (M) perpendicular to the first path and the path (N) perpendicular to the second path, projecting a coordinate of the self vehicle to a path history point of the relative vehicle and calculating a projected distance when the self vehicle exists in the region between the path (M) perpendicular to the first path and the path (N) perpendicular to the second path.

6. The method according to claim 4, further comprising:
when the self vehicle exists in the region between the path (M) perpendicular to the first path and the path (N) perpendicular to the second path, calculating gradients of the path (M) perpendicular to the first path and the path (N) perpendicular to the second path, and calculating a gradient of a distance (c) connecting the path history point on a path of the relative vehicle and the coordinate of the self vehicle;
determining whether or not the gradient of the distance (c) is a value between the gradients of the path (M) perpendicular to the first path and the path (N) perpendicular to the second path;
comparing the distance (c) with the half value of the length of the lane width; and
when the distance (c) is less than the half value of the length of the lane width, comparing the heading value of the self vehicle and the gradients of the first path and the second path.

7. The method according to claim 3, wherein when the calculated longitudinal distance is a negative number, the step of determining that the relative vehicle is positioned at the rear of the self vehicle and classifying the target position of the relative vehicle using the path history data of the self vehicle includes:
calculating a distance (a) from a position of the relative vehicle to a first path using the path history data of the self vehicle;
comparing the distance (a) from the position of the relative vehicle to the first path with a half (½) value of a length of a lane width;
when the distance (a) from the position of the relative vehicle to the first path is less than the half value of the length of the lane width, calculating a position (a) of a point projected to an extension line of the first path from the position of the relative vehicle;
determining whether or not the position (A) of the point exists on the first path;
when the position (A) of the point exists on the first path, comparing a heading value of the relative vehicle with a gradient of the first path; and
comparing a difference value between the heading value of the relative vehicle and the gradient of the first path with a set angle, and ascertaining whether or not the position of the relative vehicle is positioned at the left or right in relation to the first path when the difference value between the heading value of the relative vehicle and the first path is less than the set angle.

8. The method according to claim 7, further comprising:
when the position (A) of the point does not exist on the first path, determining whether or not the position (A) of the point is positioned on a second path or a third path; and
determining whether or not the relative vehicle exists in a region between the path (M) perpendicular to the first path and the path (N) perpendicular to the second path.

9. The method according to claim 8, further comprising:
when the relative vehicle exists in the region between the path (M) perpendicular to the first path and the path (N) perpendicular to the second path,
calculating gradients of the path (M) perpendicular to the first path and the path (N) perpendicular to the second path, and calculating a gradient of a distance (c) connecting the path history point on a path of the self vehicle and the coordinate of the self vehicle;
determining whether or not the gradient of the distance (c) is a value between the gradients of the path (M) perpendicular to the first path and the path (N) perpendicular to the second path;
comparing the distance (c) with the half value of the length of the lane width; and
when the distance (c) is less than the half value of the length of the lane width, comparing the heading value of the relative vehicle and the gradients of the first path and the second path.

10. The method according to claim 1, wherein by the calculated longitudinal distances, when it is determined that the relative vehicle is positioned at the front of the self vehicle, classifying the target position of the relative vehicle using the path history data of the relative vehicle.

\* \* \* \* \*